United States Patent [19]

Schütz

[11] Patent Number: 4,759,552
[45] Date of Patent: Jul. 26, 1988

[54] LIP GASKET OF A SYNTHETIC RESIN, ESPECIALLY FOR THE DAGGERBOARD WELL OF A SAILBOARD

[76] Inventor: Udo Schütz, Rückersteg 4, D-5418 Selters, Fed. Rep. of Germany

[21] Appl. No.: 107,563

[22] Filed: Oct. 9, 1987

[51] Int. Cl.$^4$ .............................................. F16J 15/32
[52] U.S. Cl. ...................... 277/12; 277/152; 277/165; 114/127; 114/138
[58] Field of Search ................ 277/12, 32, 152, 165, 277/237, 153; 114/127, 128, 138, 139

[56] References Cited

U.S. PATENT DOCUMENTS

| | | | |
|---|---|---|---|
| 2,968,498 | 1/1961 | Saunders | 277/152 X |
| 3,381,648 | 5/1968 | Vonck | 114/138 |
| 3,837,660 | 9/1974 | Poggio | 277/153 X |
| 4,227,700 | 10/1980 | Merry | 277/12 |

FOREIGN PATENT DOCUMENTS 1278870  9/1968  Fed. Rep. of Germany ...... 114/138

Primary Examiner—Robert S. Ward
Attorney, Agent, or Firm—Young & Thompson

[57] ABSTRACT

The lip gasket for the daggerboard well of a sailboard (1) exhibits two supporting strips (3) embedded in the board body on both sides of the daggerboard well opening (2), as well as two cover strips (5), terminating with the profile (4) of the underwater hull and designed as clamping strips, for being clamped into the supporting strips (3). The cover strips (5) consist of a flat extruded profile exhibiting an outer clamping zone (6) of a hard synthetic resin, for example polyvinyl chloride, and an inner zone, forming a sealing lip (7), of an elastic synthetic resin, for example polyurethane. The two sealing lips (7) of the lip gasket constitute an elastic, tight seal of the daggerboard well opening (2) in the folded (8') and in the deployed (8") position of the daggerboard (8).

8 Claims, 2 Drawing Sheets

LIP GASKET OF A SYNTHETIC RESIN, ESPECIALLY FOR THE DAGGERBOARD WELL OF A SAILBOARD The invention relates to a lip gasket of a synthetic resin, respecially for the bottom seal of the daggerboard well of a sailboard.

In most of the surfboard designs on the market, the sealing lips for the daggerboard well are glued into the board body. Problems are encountered in the mass production of these surfboards in that the glue bonds cannot be established throughout with the same quality, and the quality of the glue fluctuates.

Sealing lip profiles for the daggerboard well have also been mounted in the board body by means of screws. The threaded connection of the sealing lips affords, on the one hand, the advantage of ready exchangeability of sealing lips needing replacement but, on the other hand, exhibits the drawback that conditions of flow dynamics underneath the board are adversely affected by the screw heads projecting past the underwater hull.

The invention is based on the object of developing a lip gasket for the daggerboard well of sailboards that does not detach itself from the board body, does not impair the flow conditions, and is readily exchangeable in case of any damage.

This object has been attained according to the invention by the features indicated in the characterizing portion of claim 1.

Suitable embodiments of the invention constitute the subject matter of the dependent claims.

The invention is distinguished in solving the posed problem in a simple and expedient fashion. Furthermore, the lip gasket offers optimum rigidity against water pressure and is almost completely tight in the folded and in the deployed position of the daggerboard. The cover strip with the sealing lip is distinguished by a surface advantageous from the viewpoint of flow dynamics. Finally, the cover strip can be manufactured in a very economical way inasmuch as the clamping zone made of a hard synthetic resin, e.g. polyvinyl chloride, and the sealing lip of a soft synthetic resin, e.g. polyurethane, can be extruded simultaneously from these relatively inexpensive materials, with the extrusion die of an extruder being of a corresponding shape, and the two different synthetic resins firmly bond to each other during the curing step.

The invention will be described in detail below with reference to an embodiment illustrated in the drawing wherein.

Figure 1:
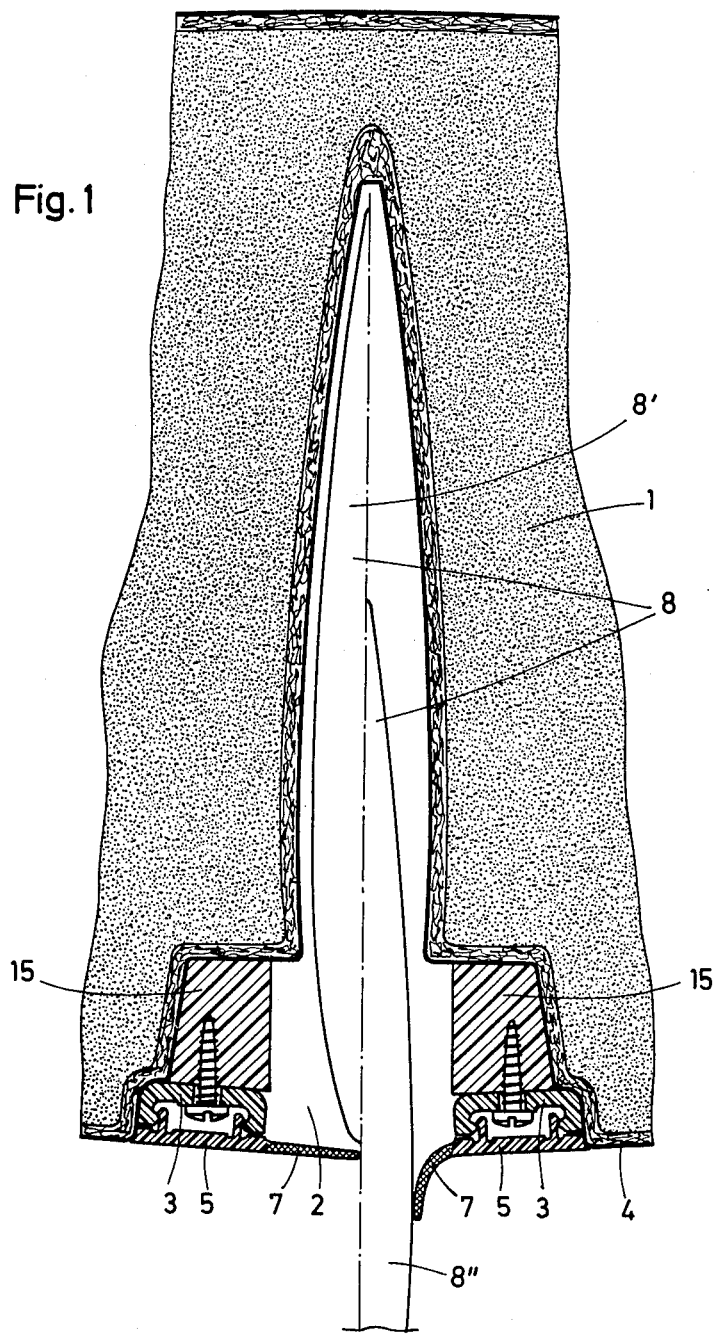
FIG. 1 shows a cross section of the lip gasket outside of the daggerboard well with the daggerboard being folded inwards and flipped outwards.
Figure 2:
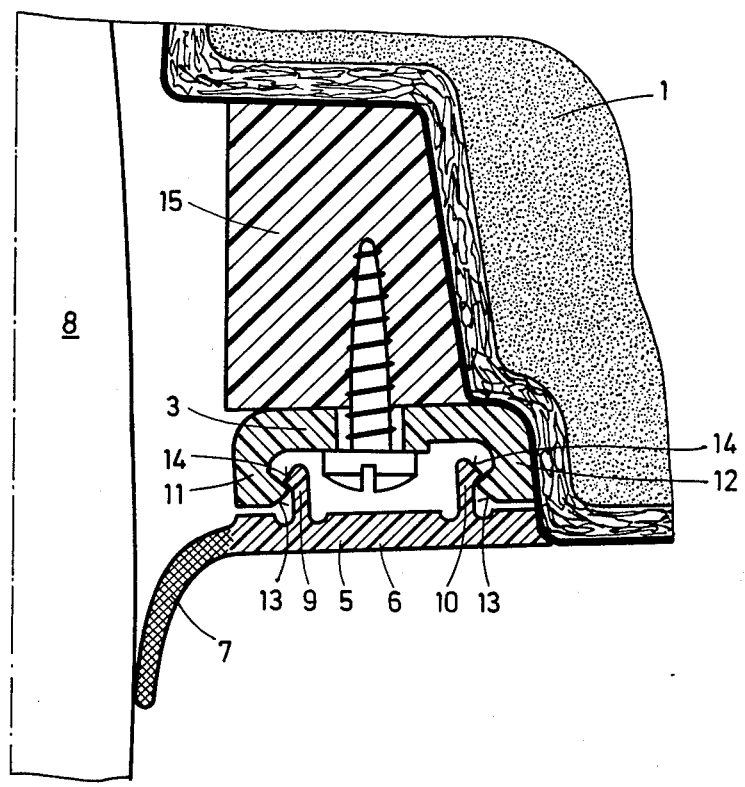
FIG. 2 shows an enlarged cross-sectional view of the cover strip of the lip gasket, clamped into the supporting strip.

The lip gasket for the daggerboard well, not shown, of a sailboard (1) exhibits two supporting strips (3) embedded in the board body on both sides of the daggerboard well opening (2), as well as two cover strips (5), ending with the profile (4) of the underwater hull and designed as clamping strips, for being clamped into the supporting strips (3). The cover strips (5) consists of a flat extruded profile exhibiting an outer clamping zone (6) of a hard synthetic resin, e.g. polyvinyl chloride, and an inner zone, forming a sealing lip (7), made of an elastic synthetic resin, e.g. polyurethane. The two sealing lips (7) of the lip gasket form an elastic, tight seal of the daggerboard well opening (2) in the folded (8') and deployed (8") position of the daggerboard (8).

Two vertical clamping webs (9, 10) are arranged on the underside of the clamping zone (6) of the cover strip (5), having a hook-shaped cross section and engaging, when the cover strip (5) is clamped into the supporting strip (3), behind the hook-shaped legs (11, 12) of the supporting strip (3) which latter has the shape of a U-profile.

At the leg ends of the supporting strip (3), obliquely inwardly oriented guide surfaces (13) are arranged for correspondingly outwardly oriented sliding surfaces (14) at the clamping webs (9, 10) of the cover strip (5), in such a way that while clampingly engaging the cover strip (5) into the supporting strip (3), the clamping webs (9, 10) of the cover strip (5) are initially urged toward the inside and then rebound resiliently and are hooked behind the hook-like legs (11, 12) of the supporting strip (3).

The supporting strips (3), consisting of a hard synthetic resin, for example polyvinyl chloride, or of aluminum, are threaded to the daggerboard well and are fixed in place outside of the daggerboard well by screws to small synthetic resin blocks (15) gluded into the sailboard (1).

In case of damage to the sealing lip (7), the cover strip can be removed and exchanged by means of a simple loosening of the clamping connection between the cover strip (5) and the supporting strip (3).

In a modification of the aforedescribed embodiment, the supporting strips (3) can be molded integrally with the bottom part of the daggerboard well, which latter is made of a synthetic resin.

I claim:

1. Lip gasket of a synthetic resin, especially for the bottom seal of the daggerboard well of a sailboard, characterized by two supporting strips (3) embedded in the board body (1) on both sides of the daggerboard well opening (2), as well as two cover strips (5), terminating with the profile (4) of the underwater hull and designed as clamping strips, for being clamped into the supporting strips (3), wherein the cover strips (5) consist of a flat extruded profile exhibiting an outer clamping zone (6) of a hard synthetic resin and an inner zone, forming a sealing lip (7), of an elastic synthetic resin, and the sealing lips (7) constitute an elastic seal of the daggerboard well opening.

2. Lip gasket according to claim 1, characterized by two vertical clamping webs (9, 10) arranged on the underside of the clamping zone (6) of the cover strip (5), these webs having a hook-like cross section and engaging, when the cover strip (5) is clamped into the supporting strip (3), behind the hook-like designed legs (11, 12) of the supporting strip (3) which latter is fashioned as a U-profile.

3. Lip gasket according to claim 2, characterized by obliquely inwardly oriented guide surfaces (13), arranged at the leg ends of the U-profile of the supporting strip (3), for corresponding, outwardly directed sliding surfaces (14) at the clamping webs (9, 10) of the cover strip (5) for compressing the clamping webs (9, 10) before entering into hooked engagement with the supporting strip legs (11, 12) during the clamping engagement of the cover strip (5) into the supporting strip (3).

4. Lip gasket according to claim 1, characterized by a detachable clamping connection of cover strip (5) and supporting strip (3).

5. Lip gasket according to claim 1, characterized in that the supporting strips (3) are screwed to the daggerboard well and are attached by a screw connection outside of the daggerboard well to small synthetic resin blocks (15) embedded in the board body (1), preferably by being glued in place.

6. Lip gasket according to claim 1, characterized in that the supporting strips (3) consist of a hard synthetic resin.

7. Lip gasket according to claim 1, characterized in that the supporting strips (3) are integrally shaped, preferably by molding, with the bottom part of the daggerboard well, which latter is produced from a synthetic resin.

8. Lip gasket according to claim 1, characterized by supporting strips (3) of aluminum.

* * * * *